US007076503B2

(12) United States Patent
Platt et al.

(10) Patent No.: US 7,076,503 B2
(45) Date of Patent: Jul. 11, 2006

(54) MANAGING MEDIA OBJECTS IN A DATABASE

(75) Inventors: John Carlton Platt, Bellevue, WA (US); Jonathan Kagle, Redmond, WA (US); Hagai Attias, Seattle, WA (US); Victoria Elizabeth Milton, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 10/021,255

(22) Filed: Dec. 19, 2001

(65) Prior Publication Data

US 2003/0009469 A1    Jan. 9, 2003

Related U.S. Application Data

(60) Provisional application No. 60/274,234, filed on Mar. 9, 2001.

(51) Int. Cl.
  *G06F 17/30*    (2006.01)
(52) U.S. Cl. ...................................................... 707/103
(58) Field of Classification Search ................ 345/433; 395/604, 605, 615; 707/1–10, 100–104.1; 725/91, 97, 117
  See application file for complete search history.

(56) References Cited

U.S. PATENT DOCUMENTS

| 5,146,552 A | 9/1992 | Cassorla et al. ............ 395/145 |
| 5,734,893 A | 3/1998 | Li et al. ........................ 707/4 |
| 5,852,823 A | 12/1998 | De Bonet ...................... 707/6 |
| 5,875,446 A | 2/1999 | Brown et al. .................. 707/3 |
| 5,893,126 A | 4/1999 | Drews et al. ............... 707/512 |
| 5,895,464 A | 4/1999 | Bhandari et al. .............. 707/3 |
| 6,085,185 A * | 7/2000 | Matsuzawa et al. ........... 707/2 |
| 6,111,586 A | 8/2000 | Ikeda et al. .................. 345/619 |
| 6,636,648 B1 * | 10/2003 | Loui et al. ................... 382/284 |

FOREIGN PATENT DOCUMENTS

| EP | 1 016 983 A2 | 7/2000 |
| WO | WO 97/22109 | 6/1997 |

OTHER PUBLICATIONS

Loui et al., Software System for Automatic Albuming of Consumer Pictures, ACM Multimedia Conference, pp. 159-162, Oct. 30-Nov. 5, 1999.
Loui et al., Automatic Image Event Segmentation and Quality Screening for Albuming Applications, IEEE International Conference on Multimedia and Expo., pp. 1125-1128, Jul. 30-Aug. 2, 2000.
Jaimes et al., Discovering Recurrent Visual Semantics In Consumer Photographs, IEEE International Conference on Image Processing, Sep. 10-13, 2000.
Stent et al., Using Event Segmentation to Improve Indexing of Consumer Photographs, pp. 59-65, ACM, 2001.
Bill N. Schilit et al., "Digital Library Information Appliances", pp. 217-225, 1998.
European Search Report dated Jul. 8, 2004.

* cited by examiner

*Primary Examiner*—Sam Rimell
*Assistant Examiner*—Mellissa M. Chojnacki
(74) *Attorney, Agent, or Firm*—Banner & Witcoff, Ltd.

(57) ABSTRACT

A method and apparatus are provided for organizing media objects in a database using contextual information for a media object and known media objects, categories, indexes and searches, to arrive at an inference for cataloging the media object in a database. The media object may then be cataloged in the database according to the inference. A method and apparatus are provided for clustering media objects by forming groups of unlabeled data and applying a distance metric to said group.

49 Claims, 13 Drawing Sheets

MANAGING MEDIA OBJECTS IN A DATABASE

CROSS REFERENCE TO RELATED APPLICATIONS

This application claims priority to U.S. Provisional No. 60/274,234, filed Mar. 9, 2001, entitled "Method And Apparatus For Cataloging And Searching Objects In A Database," whose contents are expressly incorporated by reference.

TECHNICAL FIELD

The present invention relates to managing media objects in a database. More particularly, the present invention is directed to a method and apparatus for cataloging, searching and retrieving media objects in a database using contextual information to render inferences based upon known data, categories, indexes and searches. In addition, the present invention is directed to a method and apparatus for organizing media objects that automatically organizes the media objects. A clustering algorithm is used to automatically generate information whereby a user may easily identify media objects.

BACKGROUND OF THE INVENTION

Advances in digital technology have resulted in the rapid growth of electronic media data such as still images, audio, video, graphics, and the like. For the purposes of this invention, media data includes any type of media or multimedia data including but not limited to still images, audio, video, graphics and the like. Because of this growth, there has been an increasing demand for methods and systems that enable a user to easily catalog, index and access the huge amounts of media data. However, unlike textual data, media data cannot be easily organized and searched using phrases, authors, and other traditional search terms. Techniques have been developed to address this problem with respect to still images.

One semi-automated grouping and retrieval technique for still images developed by IBM Corporation is based on image content and involves a "query by content (QBIC™)" paradigm. The QBIC™ technique relies upon classifying an image according to a small number of pre-defined fixed image features, such as distribution of color across an image, shapes in an image, and textures in an image. Once these attributes are measured for each image, a sequence of numeric values is generated for that image. When searching the QBIC™ database, queries are made by providing an example of an image similar to that which the user desires, and then setting a weight for each characteristic that the user believes accurately reflects the presence of each attribute in the desired image as compared to that in the test image. To retrieve the image, the system compares the vector for the test image, modified by weights provided by the user, to the vector for each of the images in the database.

Another technique for automating image retrieval includes mathematical techniques for looking for similarities in images. Yet another technique includes using the distribution of colors in an image to create a histogram of frequency of occurrences across a query image. The histogrammed distribution is measured for each image in the database, with an abstract-type distance measure used to compare the histogrammed results between each database image and the query image.

The foregoing techniques suffer from the disadvantage of only addressing retrieval of still images. In addition, these techniques require significant user input and are time intensive.

Therefore, there is a need for a method and apparatus for cataloging media objects in a database by forming an index to a collection of media objects. There is a need for a method and apparatus that provides organization of media objects using contextual information from which inferences may be drawn based upon known media objects, categories, indexes and searches. Further, a method and apparatus for searching and retrieving media objects from a database are needed. Moreover, there is a need for a method and apparatus for clustering media objects whereby media objects are automatically placed in a collection.

SUMMARY OF THE INVENTION

The deficiencies and limitations of the prior art are overcome by the present invention which provides methods and apparatuses for managing media objects in a database.

The method and apparatus according to the present invention utilizes contextual information for a media object and known media objects, categories, indexes and searches, to arrive at an inference for cataloging the media object in a database and for creating an index of a collection. The media object may then be cataloged in the database according to the inference.

According to another aspect of the present invention, a method and apparatus for searching and retrieving media objects in a database are provided.

According to yet another aspect of the present invention, the method and apparatus for cataloging, searching and retrieving media objects from the database may be used in PC (Personal Computer) or Web-based (World Wide Web), or any network or computing applications that require the organization and accessibility of large amounts of media objects. In addition, the present invention can be used in any computer system.

According to another aspect of the present invention, a method and apparatus is provided for clustering media objects in which unlabeled data is grouped based on a similarity to other data. A distance metric may be used to identify related media objects. Media objects may be clustered based on time-based clustering, content-based clustering or based on a combination of both.

These and other objects and features of the present invention will be apparent upon consideration of the following detailed description presented in connection with the following drawings in which like reference numerals identify like elements throughout.

DETAILED DESCRIPTION OF THE INVENTION

In order to facilitate the description of the present invention, the invention will be described with respect to the particular examples. The present invention, however, is not limited to any particular media object or limited by the examples described herein. Therefore, the description of the embodiment that follows is for purposes of illustration and not limitation.

Figure 1:
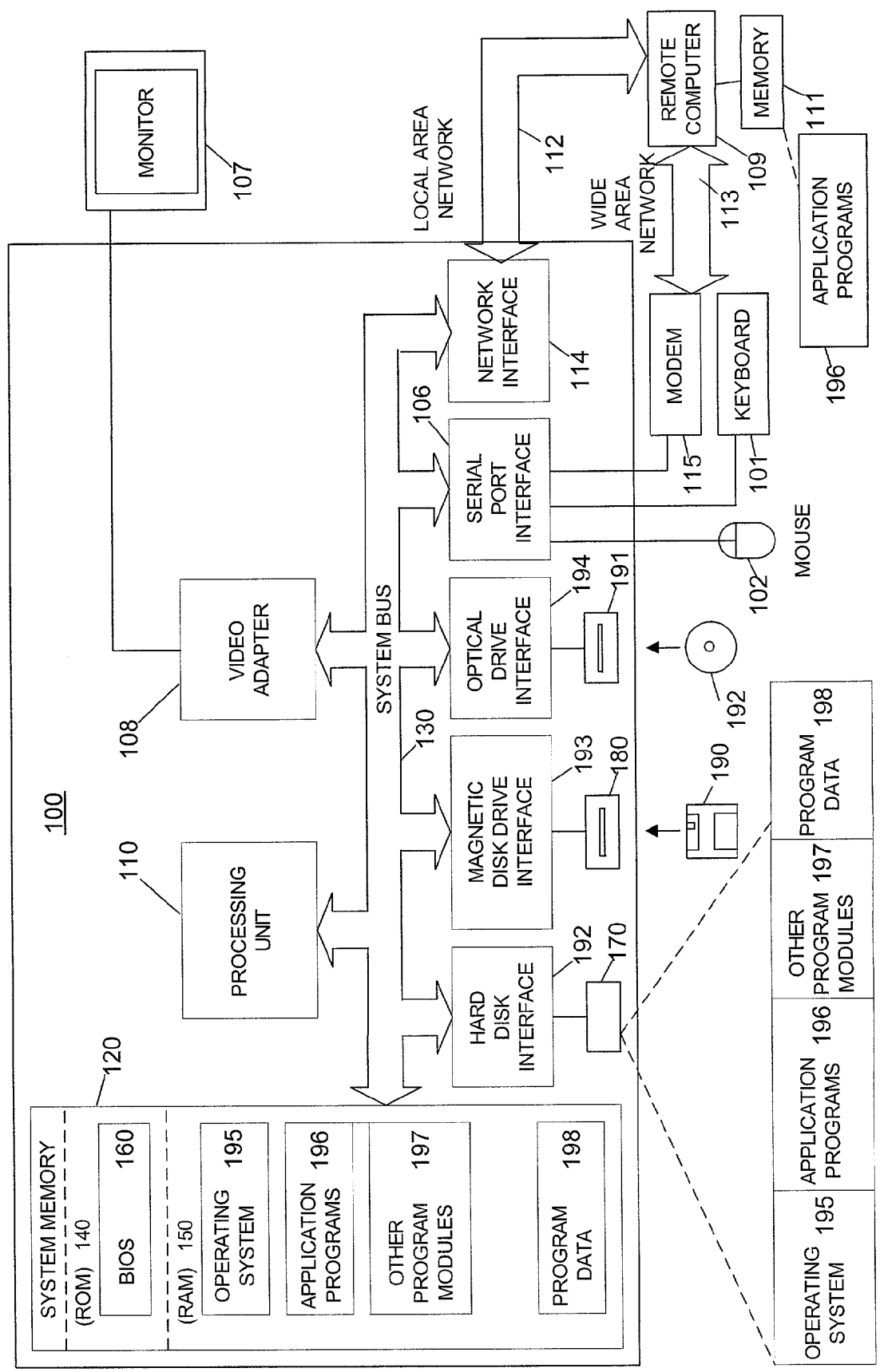
FIG. 1 a block diagram of a general-purpose digital computing environment that may be used to implement various aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above-systems or devices, and the like.

The invention may be described in the general context of computer-executable instructions, such as program modules, being executed by a computer. Generally, program modules include routines, programs, objects, components, data structures, etc. that may perform particular tasks or implement particular abstract data types. The invention may also be practiced in distributed computing environments where tasks are preformed by remote processing devices that are linked through a communications network. In a distributed computing environment, program modules may be located in both local and remote computer storage media including memory storage devices.

In FIG. 1, computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers. Computer 100 can operate in a networked environment using logical connections to one or more remote computers, as is well known in the art.

Media objects may be supplied from a storage medium, such as a CD-ROM or a PC card, etc., or supplied directly from a capture device such as a camera or a scanner, or from the Internet or some other source. Media objects are often stored in a database. Any database suitable for storing media data may be used. Cataloging refers to forming an index of a collection of media objects. Indexing refers to building a table or index that includes pointers to data. These pointers permit quick access to data without having to search and sort through information. Examples of index types that may be useful in the present invention include an index of metadata sorted by date, by photographer or other capturer, by longitude, by latitude, by zip code, by proximity to other objects, by subject matter or any other useful piece of information. Typical indexing methods include those used by databases, for example the known Indexed Sequential Access Method (ISAM). A catalog can be built as part of a file system or a database as appropriate for the desired method of access. As an example of a database, Microsoft Access by Microsoft Corporation of Redmond, Washington can be used. Microsoft Access provides for a data store, indexing on multiple keys in order to provide quick access to sets of data and methods of performing a query based on multiple factors to generate a report. The categories for the database may be standard categories within the cataloging system and/or categories that are set by the user. For example, the database may include categories for cataloging the media objects such as particular holidays, vacations, locations, dates, and the like.

Categorization according to the present invention contemplates the situation where a user pre-defines a set of labels representing a collection or category that a media object lies in such that a new object is automatically placed into one of those collections or categories. If a user does not pre-define a set of labels representing collections or categories, but all objects are automatically placed, the term for the placement is known as clustering. An index may be built by categorization or by clustering.

For purposes of describing the present invention, the following terms will be used to represent the cataloging of the database. The media objects in the database may be arranged in groups called "collections" where the media objects in a collection have similar content or relate to similar subject matter. For example, the database may include collections such as a Holiday collection, a Vacation collection, a Birthday collection, a People collection, etc. Each collection may include a number of categories. For example, the Holiday collection may have a Christmas category, a New Year's category, a Fourth of July category, etc. Keywords may be used to indicate what information is found in a media object stored under a particular collection and/or category or to index a media object. Of course, it will be appreciated by one of ordinary skill in the art that data may be arranged differently in databases and other terminology may be used in known systems. However, it will also be appreciated by those of ordinary skill in the art, that the present cataloging method may be applied to any organizing system. The language used herein is only for illustrative purposes and is not intended to limit the invention.

According to the present invention, media objects may be cataloged (i.e., indexed and put into an organized format for future reference) based upon correlation of the data for the media object and/or data describing the media object (metadata) to be stored with known data and metadata. The data correlation may be used to automatically catalog large amounts of information. For example, a user may have accumulated a large number of images taken during a vacation. When an image is captured by a digital camera, for example, it may include a date and time stamp indicating the date and time that the image was captured. If the date of the image is the same as the date of other images that have been grouped under a particular collection/category, then an inference may be made that this particular image should also be grouped under the same particular collection/category. In other words, if the images were taken on the same date, then it is likely that they represent the same event. Therefore, it may be inferred that the images be cataloged in the same collection/category of the database. The same may be true of any media objects. In another example, if the location data for an image indicates that it is within a few feet of a location of images that were all cataloged under a category for Grandmother's house, an inference may be made that this image should also be cataloged under the category for Grandmother's house. Commonality between media objects may also be used in arriving at an inference as to how a media object should be cataloged. For example, if a number of images were captured on a particular day and a group of them include images of a particular person, then an inference may be made that these images should be grouped together.

Cataloging according to the present invention involves taking known data that has been associated with attributes and labeled, for example, with "Grandmother's house" and using that known data to infer a label for other data. As demonstrated by the foregoing examples, the invention utilizes image data and metadata for a media object to make inferences based on known data and metadata, and then performs cataloging based upon the inferences. The cataloging may, on occasion, require input from the user to confirm a particular inference. Therefore, according to the present invention, cataloging of media objects in a database may be substantially automatic.

The cataloging method according to the present invention essentially involves four phases: data collection, data correlation, data refinement and data compaction. Each of these phases may be performed independently or in combination, at the same time, or at different times, and on one or more devices or databases. They may also be performed multiple times and in different orders of performance to achieve the desired results.

Data collection includes gathering ancillary data before, during or after the capture of a media object. This may be done automatically or manually, and may be related to or result from another media object capture. The data may include information added by the user via an input device such as a keyboard, or it may be supplied from other external devices. For example, information from a GPS device indicating the location where the image was captured may be added, or audio may be added from memory or an external device. The user may add a textual description of the image. The ancillary data may be stored along with the media object. The media object database may be physically the same or different from the database for storing the information concerning the media object. Underlying database technologies can include any general database, for example SQL Server, Access or Exchange provided by Microsoft Corporation of Redmond, Washington and as known in the art.

A simple example of data collection may be recording the date and time of a photograph being taken. In another example, audio may be sampled before, during, and after the photograph for later analysis. For instance, a photograph taken at a birthday party may have "Happy Birthday" sung before and after a photograph is taken. In addition, the ancillary data may be obtained from another media object based upon an inference, as discussed below.

Data correlation is the mechanism by which one or more pieces of data from the data collection phase are integrated and synthesized to form new data that may be used later to identify, organize, and search media objects. For example, by correlating GPS and date information, those photographs that were taken at a similar time and place may be detected. This may involve using an inexact search technique. Inexact searches can be performed using a variety of technologies, as is known to one skilled in the art. For example, techniques from information retrieval, inexact logic, or probabilistic searches may be used. In the birthday example noted above, data correlation may assist in determining which photograph would be associated with the "Happy Birthday" recording. In a batch-type process, each media object may be processed to determine how it should be cataloged. On the other hand, the media objects may be processed by determining all media objects relating to a particular event, time, location, etc. The correlation may be performed in a network environment to accommodate access to known information.

Data refinement relates to the process of managing and extending the data correlation process to find more meaningful data and to reject false correlations. This may involve querying the user to determine the most appropriate correlation. For example, if audio is captured in the time between two meetings, a query to the user may request identification of whether the audio is related to the first or second meeting, or neither. Another example would be to reject the correlation between images taken by two cameras during the same period of time, but at very different locations. Data refinement may also be performed based on the past action of the user on similar data. Another possibility includes enabling the user to manually set the appropriate correlation. According to the present invention, information concerning whether the media object was manually or automatically cataloged may also be stored. When a media object has been cataloged manually, it may be assumed that it has been processed correctly.

Data compaction relates to the process of removing redundant and/or useless data. Once an image is properly cataloged, indexed, and stored, much of the data used for cataloging may no longer be useful. As there can be a large amount of captured and inferred data, this phase may save a significant amount of storage space. The four most common means of doing this are linking (i.e., replacing duplicate information with a reference to that information in a common location), tokenizing or compressing (i.e., replacing data with a smaller, lossless representation), and hashing (replacing data with a unique identifier, from which the original data cannot be reconstructed). Each of these techniques is well known in the art.

Figure 2:
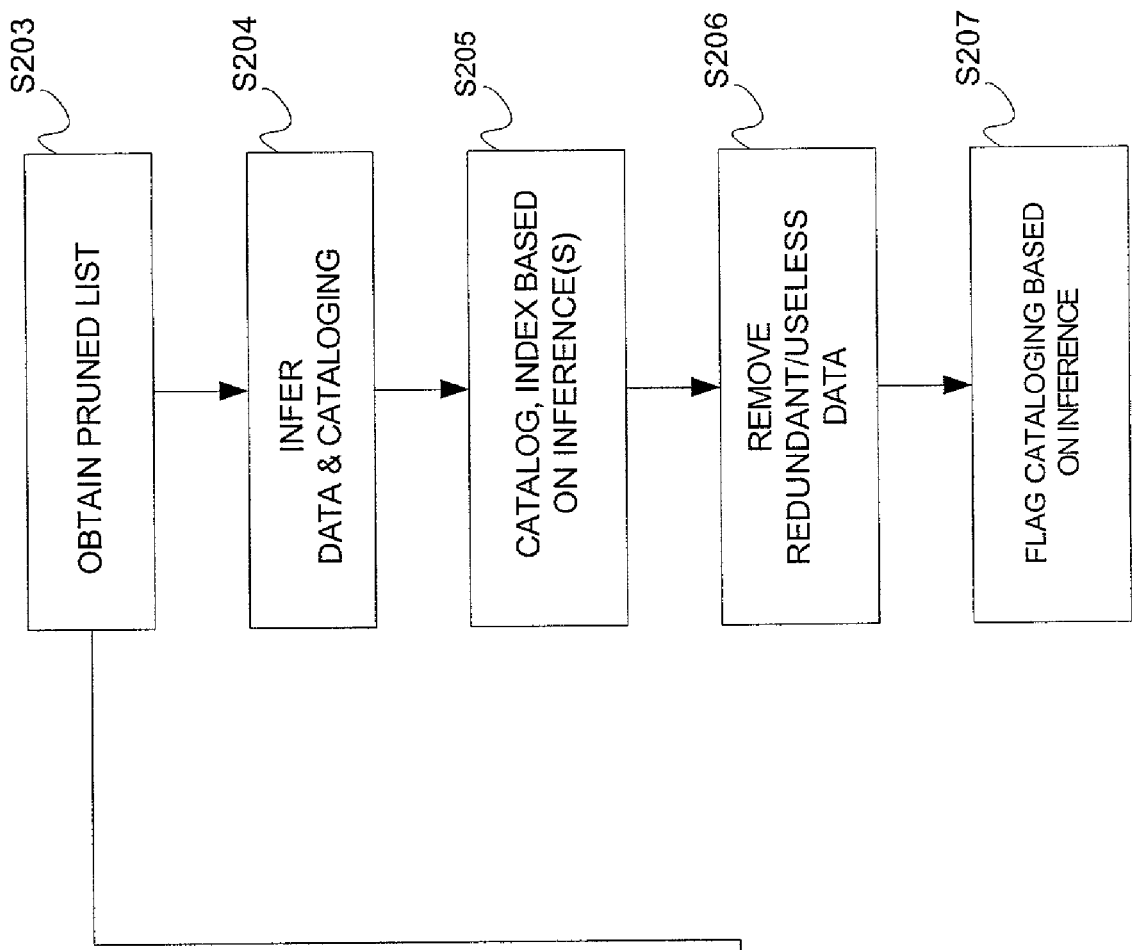
FIG. 2 is a flowchart illustrating a method of cataloging media objects in a database according to an aspect of the present invention.

FIG. 2 is a flowchart that illustrates an example of the steps for performing a method according to an aspect of the present invention. Collections and categories of the database may be standard as provided with the system. In addition, the user may add collections and categories to personalize the database. In step S200, a media object is captured, including any metadata and/or ancillary data that may be associated with the media object. The cataloging process is initiated in step S201. The cataloging method may be any one of a number of known methods that may be enhanced by the method according to the present invention. The processing may be performed on a server, on the capture device, personal computer and the like. The cataloging process according to the present invention may include processing the media object with respect to time, date, and/or location, for example. The processing may include comparing the relevant data with threshold data or performing an inexact search using known techniques, as shown in step S202. The data correlation process performed in step S202 results in a pruned list of media objects in step S203. The pruning may require querying the user to determine the most appropriate correlation of the data. In step S204, an inference may be made with respect to cataloging the media object based upon the data for the media objects in the pruned list. The media object may be cataloged in step S205 based upon the inference made in step S204. The filename may be used to index the media object in the database. For example, the terms of the filename may be used as keywords to search the database. Alternatively, any appropriate known indexing may be used to search the database. Once the media object is properly stored, cataloged and indexed, step S206 may be performed to remove redundant or useless data in order to reduce the amount of required storage space for the media object. As noted above, any one of a number of known techniques may be used to perform step S206, such as linking, tokenizing or compressing and hashing. Finally, in step S207, the information for the image may be updated to indicate that the image was cataloged based upon an inference.

Figure 3:
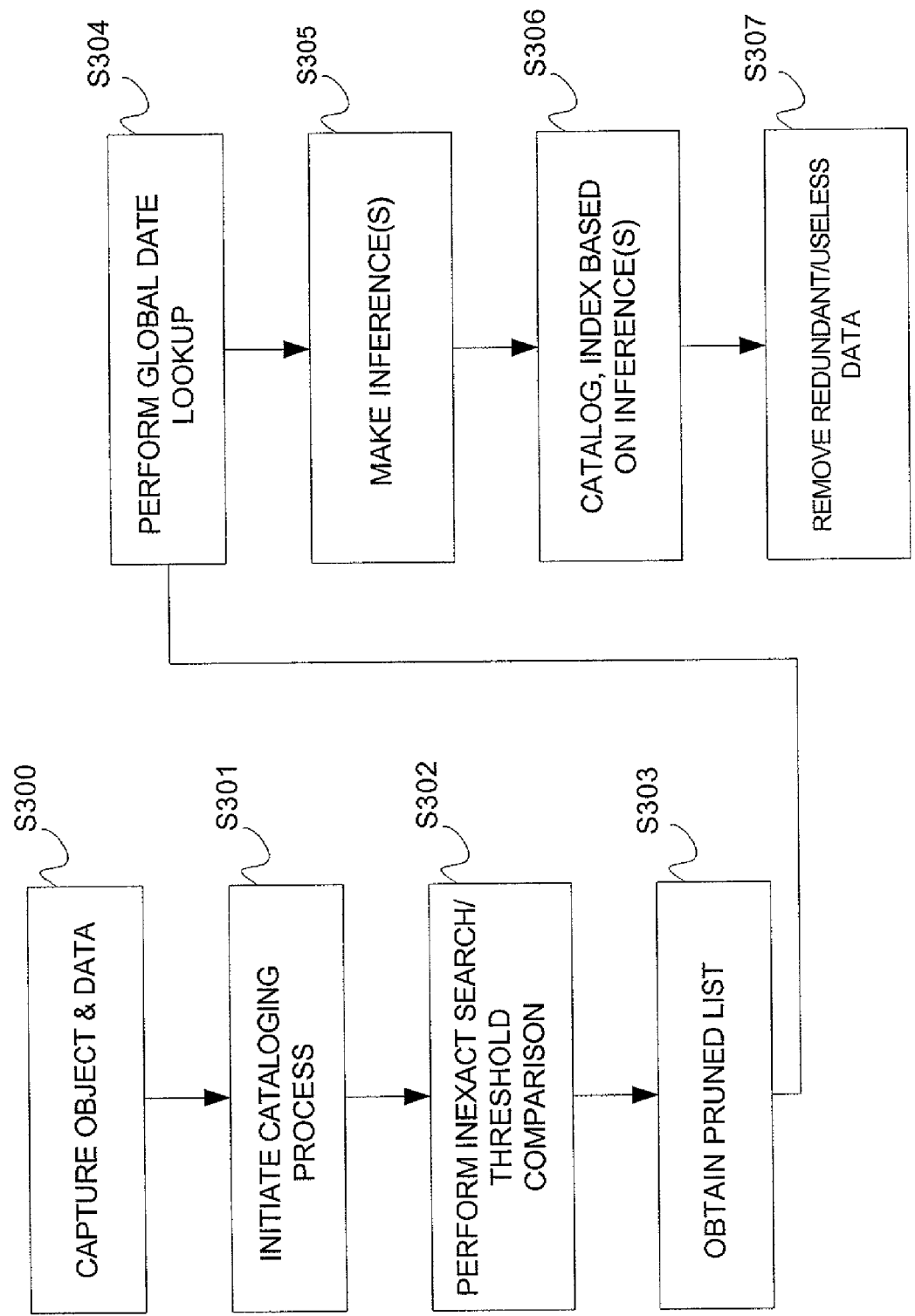
FIG. 3 is a flowchart illustrating a method of cataloging media objects through categorization in a database according to another aspect of the present invention.

FIG. 3 shows an additional level of processing according to another aspect of the present invention. More particularly, steps S300–S303 in FIG. 3 correspond to steps S200–S203 in FIG. 2. However, in step S304 of FIG. 3, information in a global calendar may be used to catalog the media object. For example, the processing in steps S300–S303 may generate a pruned list of images at a particular location. Therefore, it may be inferred that the media object to be cataloged is also an image taken at the particular location. In addition, date information for the image may be compared with dates in the global calendar lookup in step S304. If the date of the image corresponds to January 1st, it may be further inferred in step S305 that the image at the particular location was taken on New Year's Day. The image may then be properly cataloged in step S306 based upon this additional inference. Once the media object is cataloged in step S306, redundant or useless information may be removed in step S307.

In FIG. 2, the cataloging may be performed with respect to media objects that are stored in the user's database of media objects. However, it may be desirable to utilize information other than that found in the user's database to automatically catalog a media object. In FIG. 3, the use of the global calendar lookup enables the cataloging process to utilize information other than that found in the user's database to catalog the image. Similarly, information in a global map lookup, global address book, phonebook etc., may be useful in cataloging and indexing a media object. Of course, local lookups may also be possible. It will be appreciated by those of ordinary skill in the art that many other types of "lookups" may be possible for performing the method according to the present invention.

Figure 4:
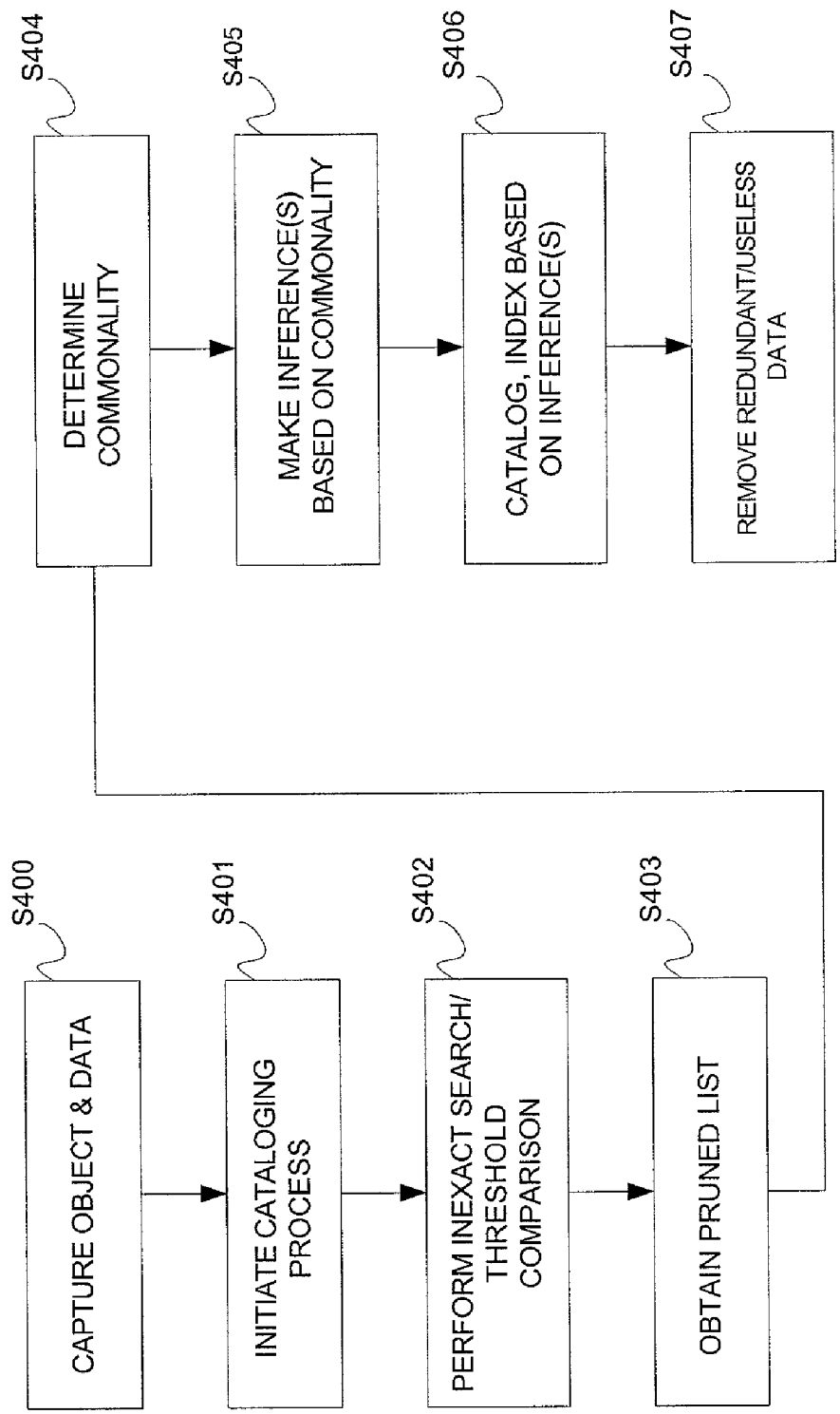
FIG. 4 is a flowchart illustrating a method of cataloging media objects through categorization in a database according to an aspect of the present invention.

FIG. 4 shows another aspect of the present invention. Steps S400–S403 in FIG. 4 correspond to steps S200–S203 in FIG. 2. In step S404, the media object may be processed to determine common features between the media object and media objects obtained in step S403. For example, the pruned list in step S403 may represent the images obtained in the last day. In step S404, the image to be cataloged may be processed with respect to the images in the pruned list to find common features. In this example, it may be determined that the images all contain a particular person. An inference may then be made in step S405 that the image should be cataloged under the people collection in the category corresponding to the particular person. In step S406, the image may be cataloged according to the inference in step S405. Finally, in step S407, redundant or useless information may be removed.

Figure 5:
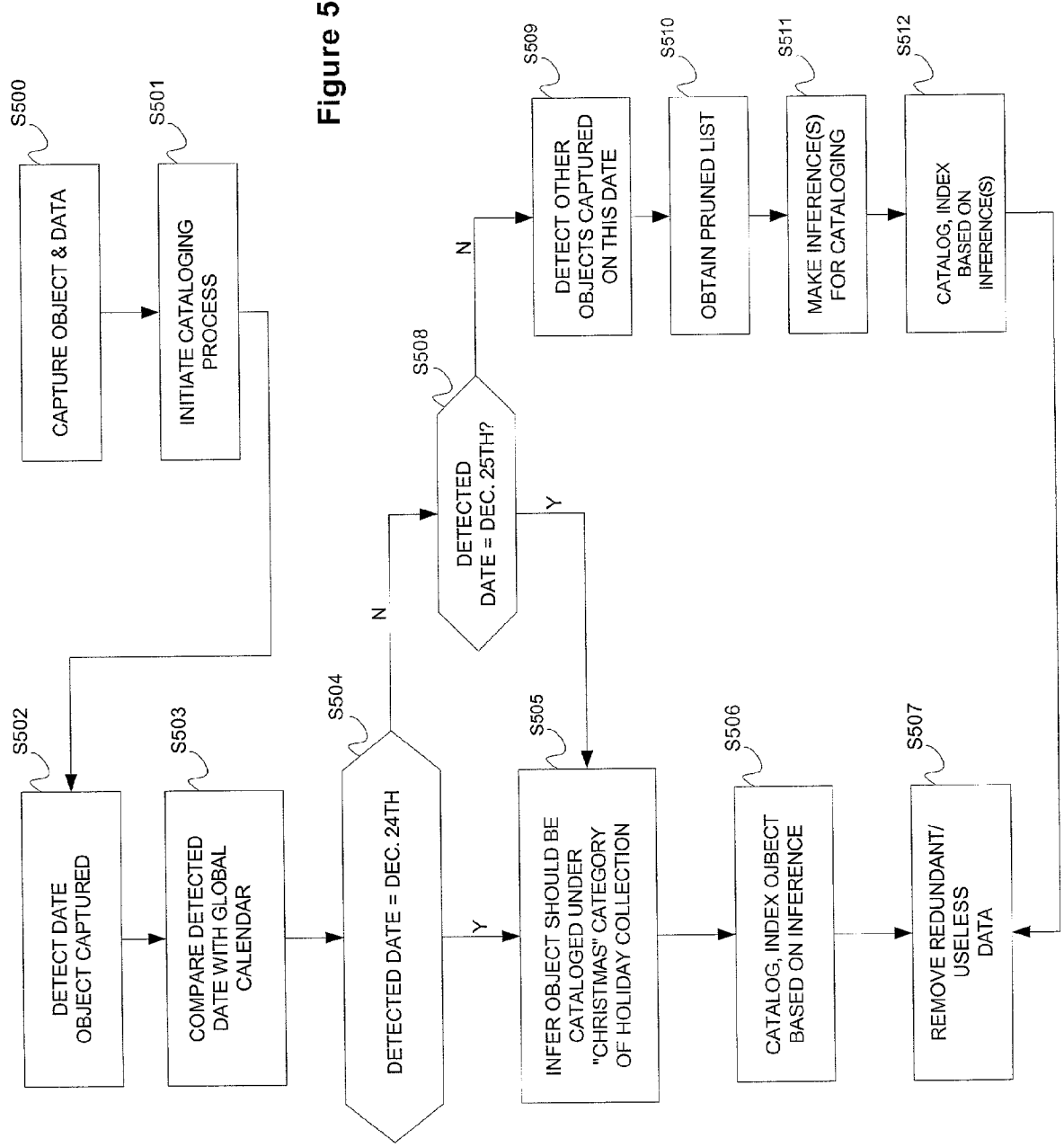
FIG. 5 is a flowchart illustrating a method of cataloging media objects through categorization according to another aspect of the present invention.

A particular example will be described with reference to FIG. 5. Once again, the example is directed to cataloging images through the use of categorization algorithms. However, as stated above, the examples set forth herein are for illustrative purposes only and those of ordinary skill in the art will appreciate that any media object(s) may be cataloged according to the present invention. Referring to the example in FIG. 5, a user may have accumulated a large number of images taken during the Christmas holidays. Information for these images may be used to distinguish them from other images so that they can be organized together in a database. A holiday collection may be arranged in the database having categories corresponding to particular holidays, respectively. One holiday category may correspond to "Christmas." Images that were captured on December $24^{th}$ or December $25^{th}$ may be organized under the "Christmas" category.

In step S500, an image is captured along with any data that may be associated with the image, including data added by the user or data supplied from some other external source or device. In the current example, the date will be used for organizing the images. In step S501, the cataloging process is initiated. More particularly, in step S502, the date on which the image was captured may be detected. In step S503, the date is compared with the date in a global calendar lookup. In step S504, it is determined whether the date on which the image was captured is December $24^{th}$ If the image was captured on December $24^{th}$ in step S505 an inference may be made that the image should be cataloged in the Christmas category of the Holiday collection. In step S506, the image may be cataloged based upon the inference. In step S507, redundant or useless information may be removed. If the date of the image does not correspond to December $24^{th}$, it is determined in step S508 whether the date corresponds to December $25^{th}$. If the answer is Yes in step S508, then steps S505–S507 are performed. If the answer in step S508 is No, then other processing is performed. In this example, in step S509, other media objects captured on the same date on which the image was captured are detected to arrive at a pruned list in step S510. An inference may be made in step S511 as to how to catalog the image based upon the information for the media objects in the pruned list. The image may then be cataloged in step S512 based upon the inference. Finally, step S507 may be performed to remove redundant or useless data. Once the image is stored in a particular category, the filename may be used as keyword(s) for indexing the image in the database. Of course, one of ordinary skill in the art will appreciate that any appropriate indexing method may be used.

Figure 6:
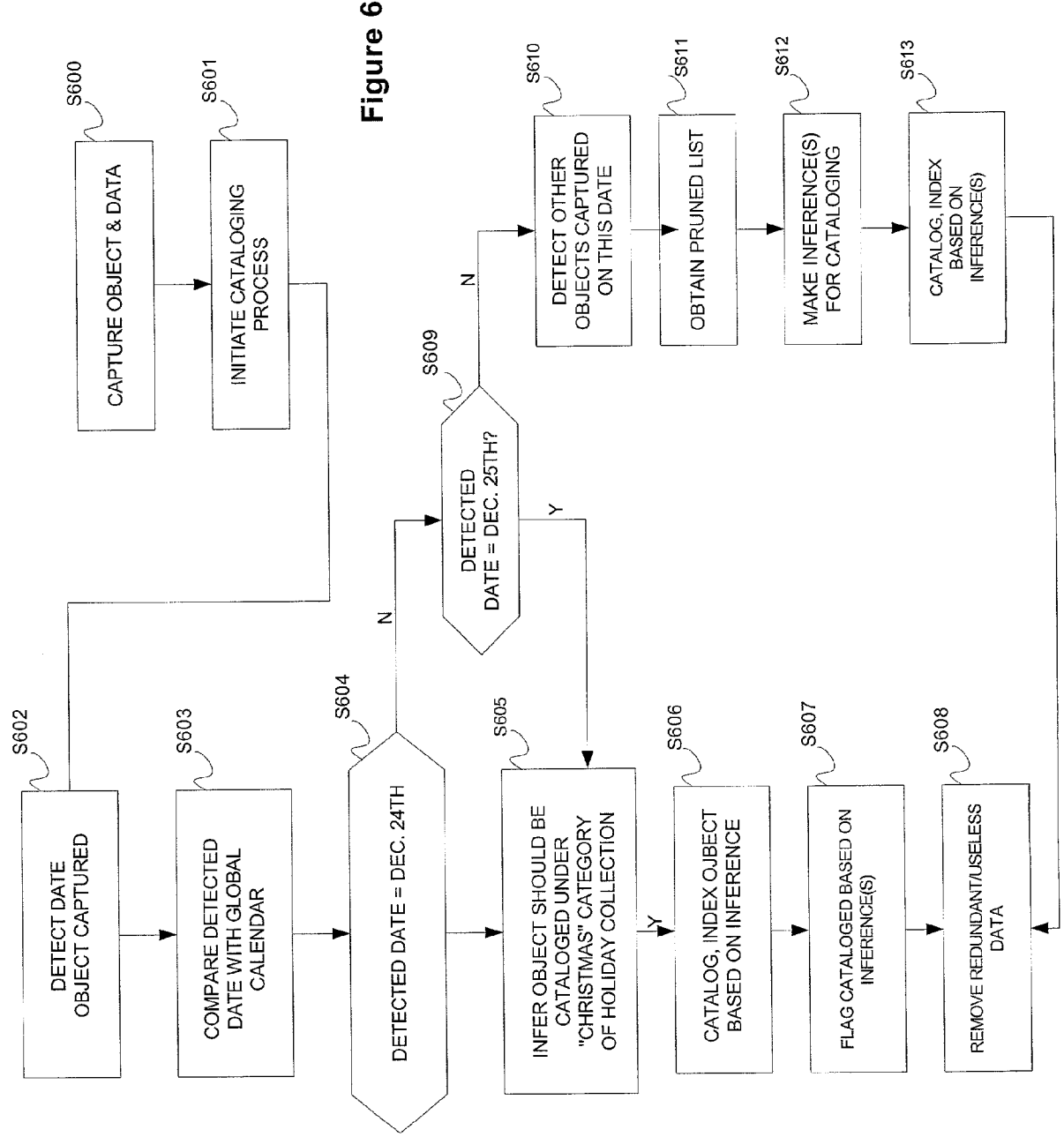
FIG. 6 is a flowchart illustrating a method of cataloging media objects through categorization according to another aspect of the present invention.

Referring to FIG. 6, once the inference is made in step S605 that the image should be organized with Christmas images, the image may be properly cataloged in step S606. The information for the image may be updated to indicate that the image was cataloged based upon an inference in step S607. The identification of inferred data may indicate that there is a certain level of unreliability of the information as compared to manually indexing the media object. Steps S600–S604 and steps S609–S613 are the same as steps S500–S504 and S508–S512 in FIG. 5.

Figure 7:
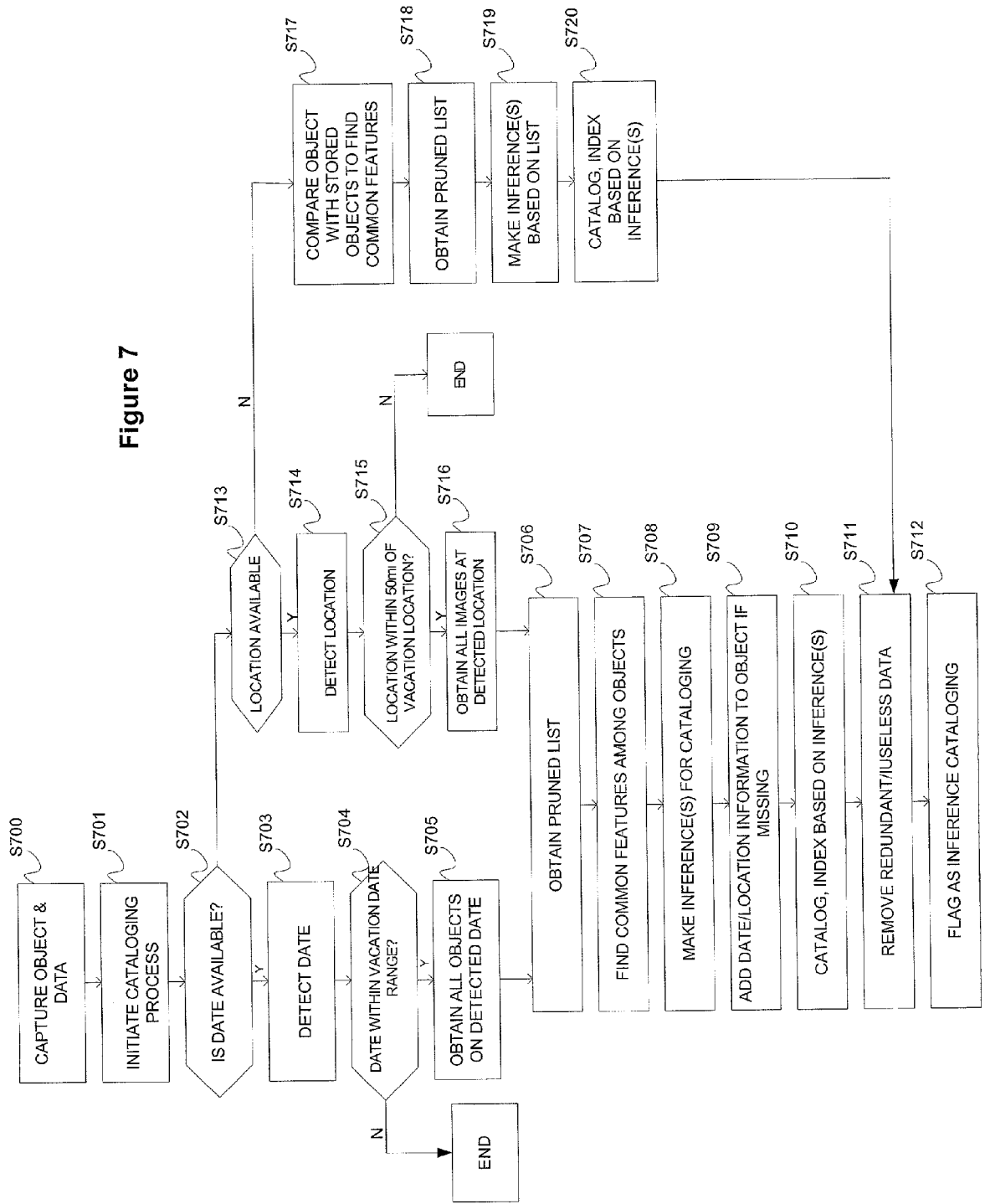
FIG. 7 is a flowchart illustrating a method of cataloging media objects through categorization according to another aspect of the present invention.

In another example, the date and location may be correlated to organize images, as shown in FIG. 7. In step S700, an image is captured along with any data that may be associated with the image, including data added by the user or data supplied from some other external source or device. The cataloging process is initiated in step S701. In step S702, it is determined whether date information is available. If the answer in step S702 is Yes, then the date is detected in step S703. The date is then compared with a date range corresponding to the user's vacation, for example, in step S704. If the date is within the vacation range, then processing continues to step S705. In step S705, all of the images having the same date as the detected date are obtained from the database and added to the pruned list in step S706. If the answer in step S704 is No, then processing ends.

If the answer in step S702 is No, then in step S713, it is determined whether location information is available. If the answer in step S713 is Yes, then the location information for the image is detected in step S714. In step S715, it is determined whether the location information is within fifty miles of the vacation location. If the answer in step S715 is Yes, then processing continues to step S716. If the answer in step S715 is No, the process ends. In step S716, all of the images at the detected location are detected. In step S706, all of the detected images are added to the pruned list. If the answer in step S713 is No, then other cataloging processes are performed. In this example, the image may be compared with other media objects to detect common features between the image and any of the stored images in step S717. The images that include common features may be added to a pruned list in step S718. An inference may be made in step S719 as to how to catalog the image based upon the information for the media objects in the pruned list. The image may then cataloged in step S720 based upon the inference, and processing continues at step S711.

In step S707, the images in the pruned list are processed to determine those images having common features with the image to be cataloged. In step S708, an inference is made on how the image should be cataloged based upon the information obtained in step S707. In step S709, date or location information may be added to information for the media object if either of this data is missing. In step S710, the image may be cataloged. In step S711, redundant or useless data may be removed. Finally, in step S712, the media object may be flagged as having been cataloged based upon inference(s).

At present, files in an operating system may be retrieved by searching by date, by file size, last modified, etc. It would be helpful to enable a user to search a database by location or category, for example. For example, a user may want to search a database of images by searching all of the images taken at Grandparents' house. According to an aspect of the present invention, even if there is no index for images taken at Grandparents' house, the search may be performed by going through all of the images and determining which images have a GPS location corresponding to the location of Grandparents' house. Alternatively, the search may be performed by determining which photos were taken during a trip to the Grandparents' house as listed in a local calendar. Therefore, according to an aspect of the present invention, searches may be done on the fly just as an indexing system or done as a way of setting up a search.

Figure 8:
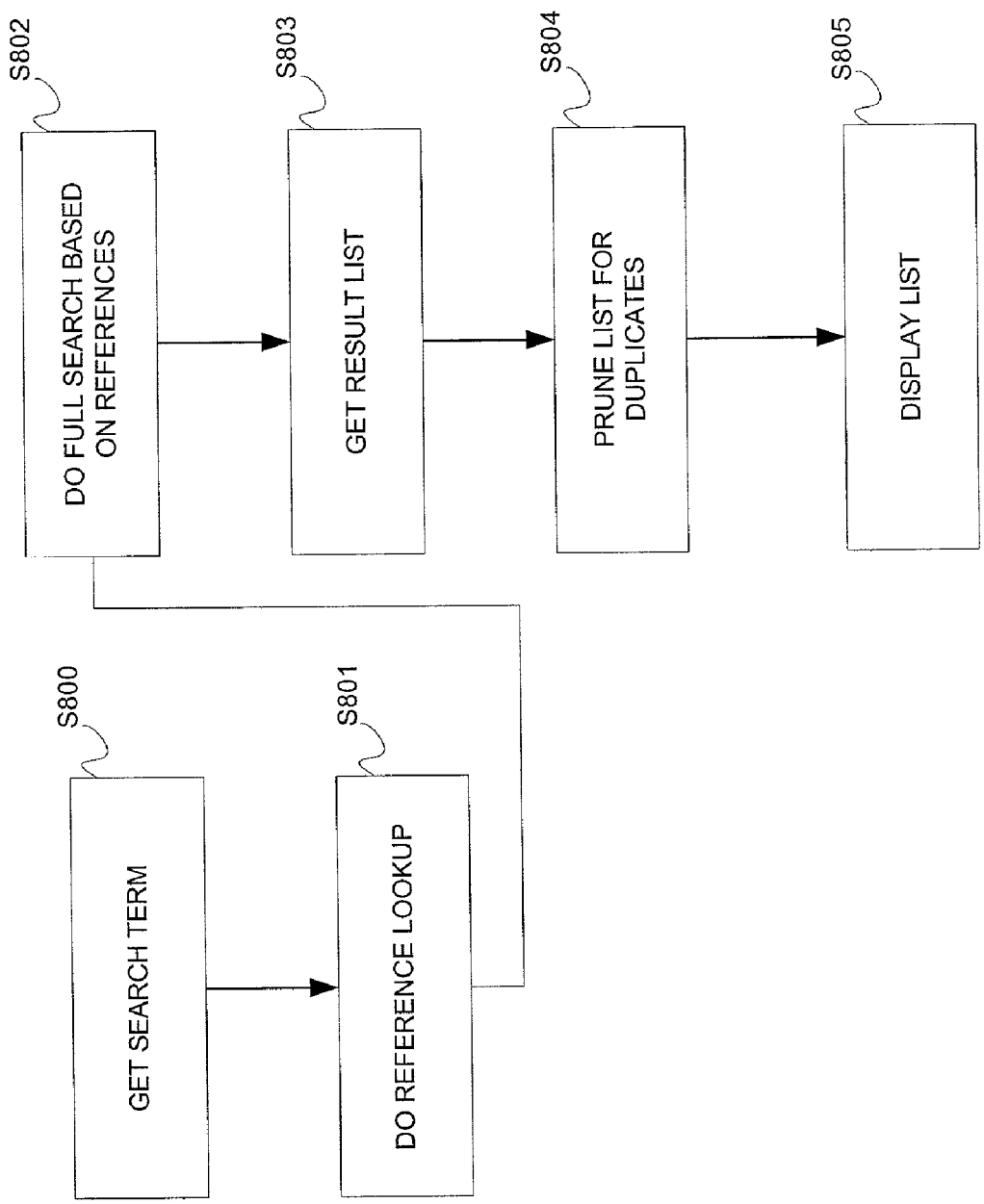
FIG. 8 is a flowchart illustrating a method of searching a media database according to an aspect of the present invention.

Referring to FIG. 8, an example of searching and retrieving data from a database according to an aspect of the present invention will be described. The search may be performed using a general search engine, or it may be limited to a local database. In step S800, a search term is identified, e.g., St. Patrick's Day, March $17^{th}$, etc. In step S801, a reference lookup is performed via a table of references. In the present example, the reference lookup may include looking up March 17, Leprechaun. In step S802, a full search may be performed based on references obtained from reference lookup on step S801. The list of hits is displayed in step S803. The list may then be pruned in step S804 according to known pruning techniques. For example, the list may be pruned to remove duplicates. The resulting search list is displayed in step S805.

Another example of automatically organizing media objects will now be described. Once again, the embodiment will be described with respect to the example of still images, and organization is based upon creation date or color.

However, the embodiment may be implemented with any media object and based upon some other criteria other than time or color.

According to this aspect of the invention, media objects, such as still images, are automatically organized into various collections by clustering images that are taken near each other in time. The images in each collection often tend to be thematically related, in addition to temporally related. A user interface in this embodiment may include one image per collection, where the image is shown to the user. If the user is searching for an image, the user views the images respectively representing collections of images, and selects a collection that appears to relate to the desired image. Once a collection is selected, the images corresponding to the collection are shown to the user. In this way, the user can quickly find a desired image.

Figure 9:
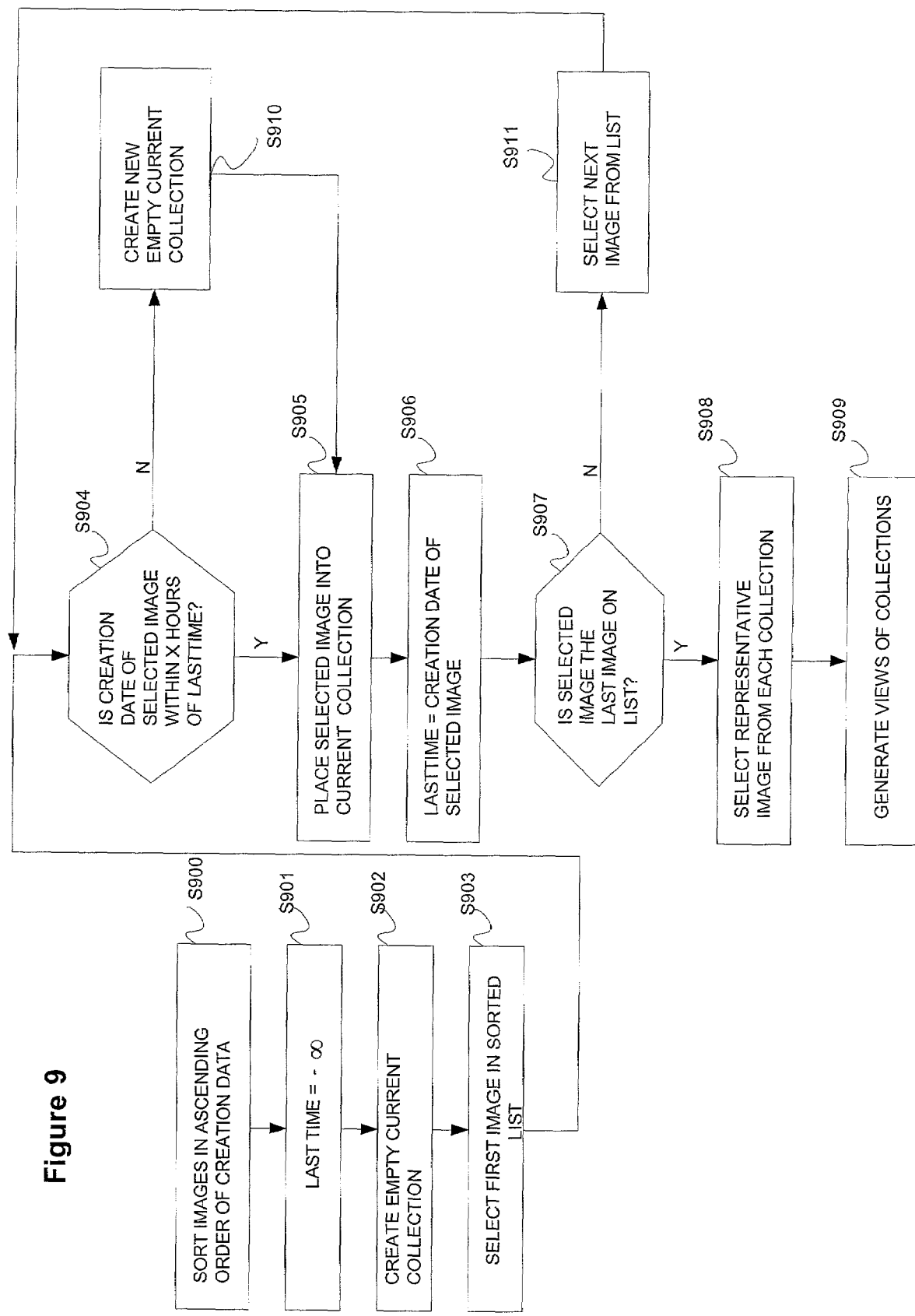
FIG. 9 is a flowchart illustrating a method of organizing media objects via clustering according to an aspect of the present invention.

The process for automatically organizing media objects, such as still images, into various collections according their creation times will be described with reference to FIG. 9. In step 900, the images in some predetermined directory structure, such as the "My Pictures" directory under the Windows® operating system (OS), for example, are sorted in ascending order by creation date. In step S901, a variable denoted "lasttime" is set to effective negative infinity (e.g., a quantity less than the earliest date represented under the OS). An empty current collection is created in step S902. The first (earliest created) image is selected for processing in step S903. Of course, processing could be performed beginning with the latest (last created) image. The creation time of the current image is compared to the lasttime variable in step S904. If the difference between these two times is less than X hours, for some value of X, the two images are placed in the same collection. The value of X may be set by the user to any suitable time such as 1 hour, 24 hours, 15 minutes, etc. The shorter the time set for X, the more collections that are created, which will tend to be more thematically related, but will require the user to scan through more collections. A default value for X may be set and the user may adjust the default value as desired. If the answer in step S904 is Yes, then the image is stored in the current collection in step S905. If the answer in step S904 is No, then the current image is not stored in the current collection. Rather, a new empty current collection is created in step S910, and processing continues to step S905 where the current image becomes the first image stored in the new current collection.

In step S906, the lasttime variable is updated to reflect the creation date of the current image stored in the current collection. In step S907, it is determined whether the current image is the last image in the sorted list of images. When the answer in step S907 is No, then the next image in the sorted list is selected in step S911 and processing returns to step S904. If the answer in step S907 is Yes, then a representative image for the current collection is selected in step S908. The images in each collection may be sorted in order of creation time. The representative image for each album may be the image with the median creation time, i.e., the picture in the middle of the list of images in the collection sorted based upon creation time. Finally, in step S909, the view of the collection is generated.

More specifically, referring again to S903, it is desirable that the threshold X not be a constant, but rather be computed adaptively based on the differences in creation time of temporally nearby images. Allowing the threshold X to be computed adaptively provides an advantage that the threshold will adapt to the typical behavior of the user and will identify the unusual temporal gaps between photographs.

The adaptive threshold is determined by the following formula:

$$\log(X_n) = \log(17) + \frac{1}{20} \sum_{i=n-10}^{n+9} \log(t_{i+1} - t_i) \quad (1)$$

In Formula 1, i indexes the media objects, (for example, photographs) in order of creation time, $t_i$ is the creation time of photograph i, and $X_n$ is the threshold that is compared to the difference between $t_n$ and $t_{n+1}$. Formula 1 thus computes a running average of the log time gaps between photographs, in the example. If the indices i in the sum access creation times that do not exist for a media object, then the sum only runs over indices i that do, in fact exist. As a result, the value in the denominator, 20, is reduced to the number of terms in the sum.

Figure 10:
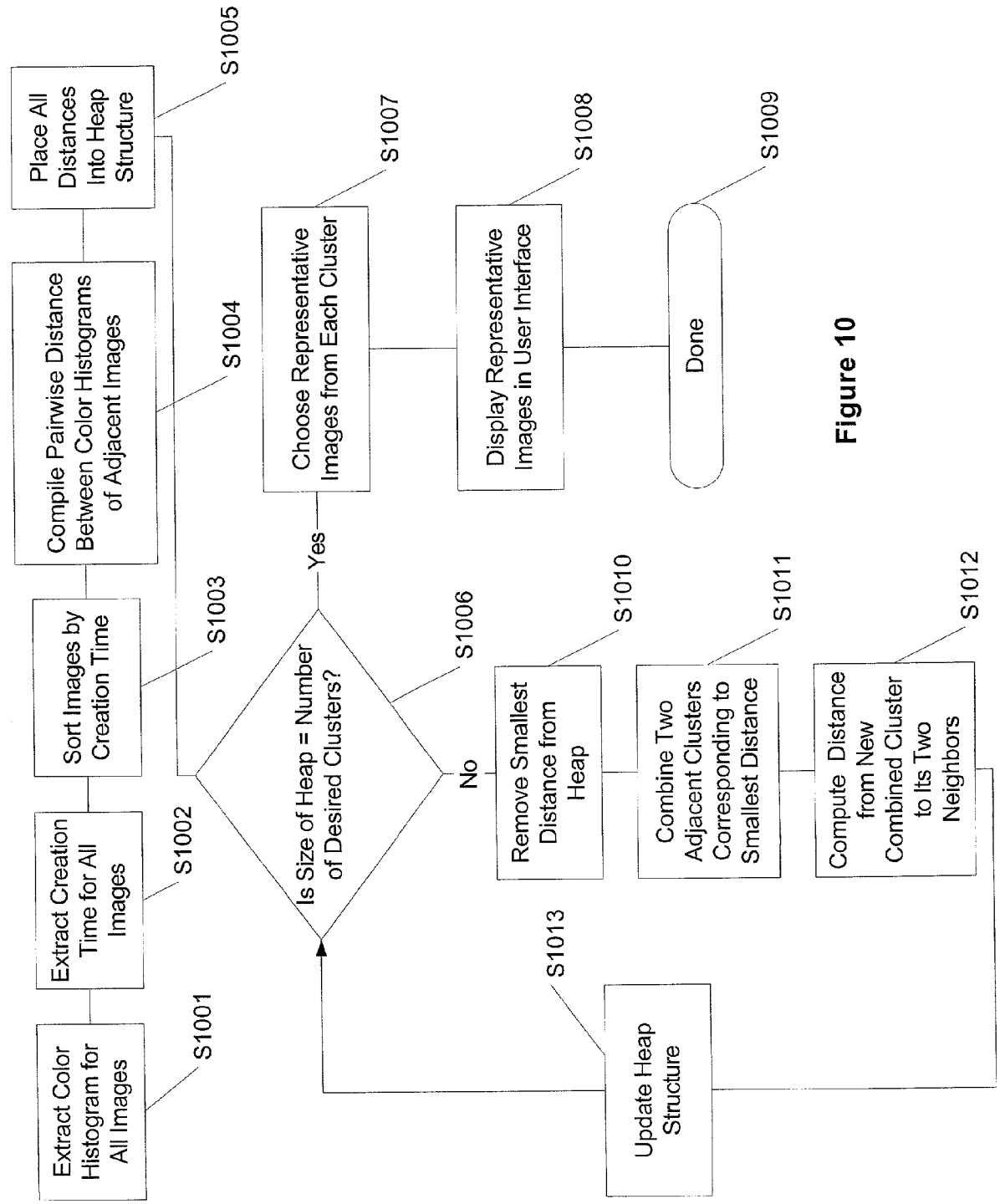
FIG. 10 is a flowchart illustrating a color clustering algorithm for media objects according to an aspect of the present invention.

Referring to FIG. 10, a flowchart is provided which describes a color clustering algorithm for media objects (photographs in the present example). Color clustering is useful when the creation time of the media objects are either unreliable or unavailable. In S1001, a color histogram for all images is created. The process of extracting color histograms is well known in the art and therefore will not be described in detail here. Preferably, the color histograms are taken over all pixels of images that are downsampled by a factor of 4 or 8, thus increasing the speed of the histogram computation. Optimally, the color histogram is taken in the CIE u' v' color space. By taking the color histogram in the CIE u' v' color space, pixel luminance is ignored. This is desirable because the pixel luminance does not predict the topic of the media object, here a photograph. Ideally, the histogram has 16×16 equally spaced bins in color space, spanning from 0.1612 to 0.2883 in u' and 0.4361 to 0.5361 in v'. Pixels falling outside this area in color space are mapped to the nearest bin.

The histogram may be estimated in a Bayesian manner, using maximum a posteriori methods and a uniform prior, as is well known in the art. The histogram is initialized with so-called "phantom data." Before all pixels of an image are scanned, every bin is initialized to 1/256. As is also known in the art, a "number of pixel" counter is required to compute a histogram; the number of pixel counter is initialized to 1. By initializing the number of pixel counter to 1, no bin is allowed to attain a value of 0 which is desirable in the computation of the Jensen-Shannon distance in equation 4 of S1004, described below. The histogram is best estimated in a smoothed manner as is further known in the art. The histogram may be smoothed via so-called bilinear interpolation wherein every scanned pixel increases up to four histogram bins, according to standard bi-linear interpolation rules.

In S1002, the creation time for all images is extracted. As is known in the art, JPEG images produced by digital cameras have image metadata stored in a format known as the EXIF format. The creation time for the photograph in the present example is stored as a filed in the EXIF format. Techniques for extracting the creation time are well known in the art. Occasionally, the creation time in the EXIF format is missing or incorrect. This can occur, for example, when the internal clock of a digital camera gets reset to an initial value when the internal battery of the camera runs down. By way of example, this situation might be detected by an EXIF creation time that occurred before a certain date, such as Jan. 1, 1999. In addition, it is possible that the EXIF metadata might be entirely deleted after image capture by way of image manipulation tools. Where the EXIF creation time is incorrect or missing, the file creation of modification date can be used as a substitute when that information is available, such as when a personal computer is being used.

In S1003, all of the photographs in the example are ordered by imputed creation time. In the alternative, the ordering step S1003 can be derived form the innate ordering of JPEG filenames produced by digital cameras, for example, P000006.JPG would be known to have been taken after P000005.JPG.

Turning to S1004, the pairwise distance between color histograms of adjacent pairs of ordered images is computed. By way of example, assume $p_i$ and $q_i$ are the ith color histogram bin values of two adjacent images (or collections). These probabilities are computed by taking the ratio between the number of pixels that fall into the ith bin (as modified by the known techniques of Bayesian inference and smoothing) to the total number of pixels that fall into all bins. Thus, $p_i$ and $q_i$ are computed as follows:

$$p_i = \frac{n_i}{N} \quad q_i = \frac{m_i}{M} \tag{2}$$

for bin values $n_i$ and $m_i$ and total number of pixels N and M for the first and second images, respectively. If $r_i$ if the ith color histogram bin of a tentative cluster of images consisting of two adjacent clusters or images, then the value $r_i$ can be computed as follows:

$$r_i = \frac{n_i + m_i}{N + M} \tag{3}$$

The distance between the two images or clusters can thus be determined as follows:

$$\sum_i -(n_i + m_i)\log(r_i) + n_i\log(p_i) + m_i\log(q_i) \tag{4}$$

where a term that evaluates to 0 log 0 is treated as 0. As is known in the art, other distance metrics can be used, including known techniques of chi-squared or L1 norm. In step S1004, these distance metrics are computed between two images, but in step S1012, the same distance metric used in step S1004 is computed between two clusters.

In S1005, S1006, and S1010 through S1013 in FIG. 10, Omohundro's best-first model merging technique is applied to clustering photographs. Best-first model merging is a clustering technique that starts with a set of items that are sorted into a sequence. The technique starts with each item in its own cluster. Then, at every step, the distance between every pair of adjacent clusters is computed. The pair with the smallest distance is merged together to yield a new cluster. This new cluster replaces the two old clusters in the sequence, and the clustering continues until the desired number of clusters is reached. In S1005, all of the distances are placed into a heap data structure which permits finding the least element in O(logN) time, where N are the number of elements stored in the heap, as is well known in the art. In S1006, the algorithm checks for termination by comparing the size of the heap (i.e., the number of elements in the heap) to the number of desired clusters. The number of desired clusters can be, for example, 1/12 the total number of photographs. The ratio between the number of clusters and the number of photographs is the compression ratio of representative images to all photographs in the user interface. If S1006 indicates that fewer clusters must be found, then S1010 finds the smallest Jensen-Shannon distance (equation 4 in S1004) in the heap and removes it from the heap. The two clusters (or images) which result in this smallest distance are also found. Step S1011 combines these two adjacent clusters (or images) to yield a new cluster. The new cluster contains pointers to all images contained in the previous two clusters. In addition, the histogram for the combined cluster is computed, as previously shown. Step S1012 computes the distance from the new combined cluster to its two new neighboring clusters (or neighboring images). Again, the distance is computed between two adjacent clusters and the speculative cluster that results by combining the two adjacent clusters. In step S1013, the heap structure is rearranged in order to maintain the heap property, as is known in the art. Control then flows back to step S1006.

Referring to step S1006, if the correct number of clusters has been found, then control flows to step S1007 where representative images are chosen from each cluster. For every cluster, the overall histogram that describes all images have been formed at either step S1004 or S1012. The representative image is chosen from the images that belong to the cluster to minimize the Kulback-Leibler (KL) distance between the overall histogram $r_i$ and the histogram for the representative image $s_i$:

$$\sum_i r_i \log\left(\frac{r_i}{s_i}\right) \tag{5}$$

The representative image is the image whose color best mimics the overall color of the cluster. In step S1008, all of the representative images are displayed in a user interface.

Figure 11:
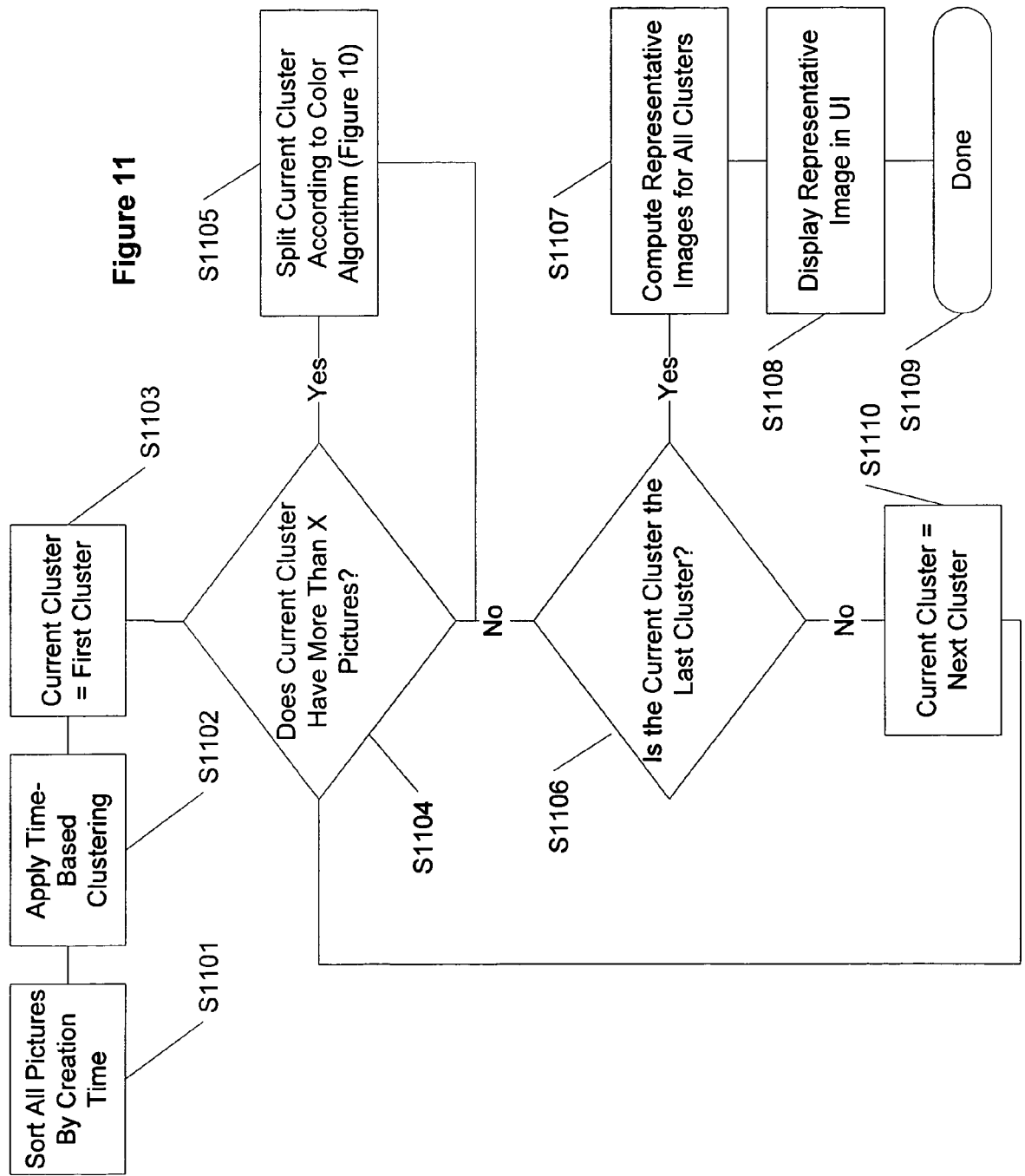
FIG. 11 is a flowchart illustrating temporal and color clustering of media objects according to an aspect of the present invention.

Referring to FIG. 11, a flowchart is shown depicting a method which combines temporal and color clustering of photographs. This combination uses the better clustering of the temporal algorithm but falls back to color clustering when the temporal data is incorrect. In step S1101, the pictures are sorted by creation date. In step S1102, the temporal clustering algorithm is applied, as shown in FIG. 9 (except for S908 and S909) resulting in a number of clusters. These clusters are then scanned in steps S1103–S1107 to check for failure of the temporal clustering. The existence of overly large clusters is evidence of temporal clustering failure. Thus, step S1103 first sets the current cluster to the first cluster and step S1104 counts the number of images in the current cluster. If the number is larger than a threshold X, step S1105 will split the current cluster into sub-clusters according to the color algorithm described in FIG. 10, except for steps S1007 and S1008. Preferably, the threshold X is 23. If the number is larger than the threshold X, the desired number of sub-clusters is preferably 1/12 of the number of photographs in the current cluster, rounded to the nearest integer. Upon successful splitting of the current cluster into sub-clusters, or if the current cluster has less than or equal to X images, control flows to step S1106 which can terminate the loop if the current cluster is the last cluster. If it is not, step S1110 makes the current cluster the next cluster and control returns to step S1104. Otherwise, control flows to step S1107 which computes representative images for all of the clusters (including both temporal and color clusters).

This step is analogous to step S1007 in FIG 10. In step S1108, the representative images are shown in the user interface and in step S1109, the process is completed. It is desirable to sort the representative images by increasing creation time prior to display.

Figure 12:
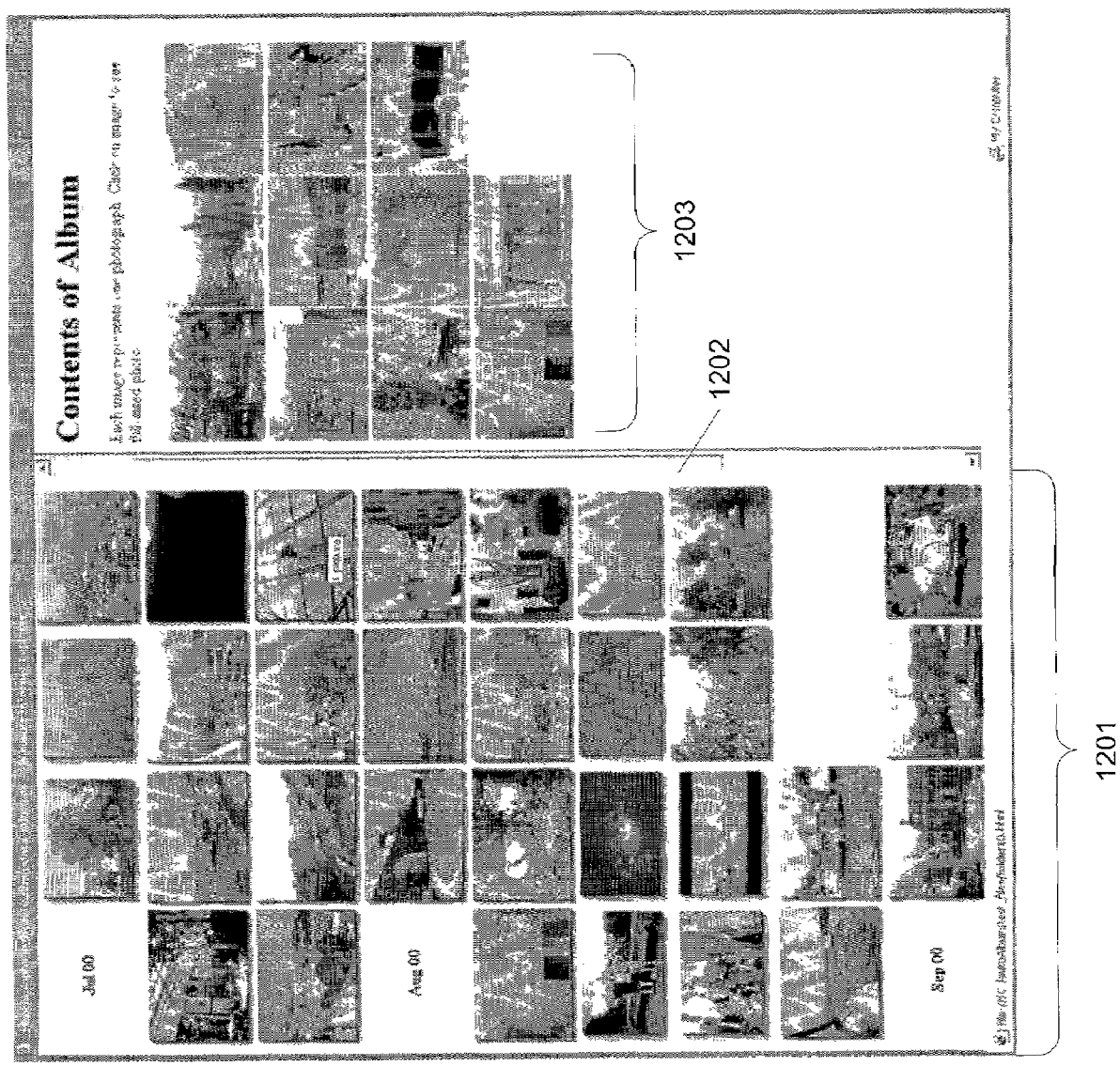
FIG. 12 illustrates another graphical user interface according to an aspect of the present invention.

FIG. 12 shows a possible user interface. The user is presented with a user interface containing two panes. The left pane consists of thumbnails of representative images, represented collectively by 1201 in FIG. 12. These thumbnails of representative images are of all of the clusters of the user's photographs, in the present example. These thumbnails are sorted by increasing creation time. The user can scroll through the representative images by using scroll bar 1202 as is known in the art. In addition, dates can be shown intermixed with or below each of the thumbnails. When a user clicks on a representative image in 1201, the contents of that cluster are shown in the right pane as thumbnails in 1203. If there are too many photographs in the selected cluster to show in the right pane, an optional scroll bar 1204 (not shown) can be used to scroll through the contents of the cluster. When a user clicks on a thumbnail in 1203, the user is shown a full-sized version of the image. Alternatively, if the user drags or copies a thumbnail from 1203, the full-sized image can be a drop candidate or can be put on a clipboard, respectively.

Figure 13:
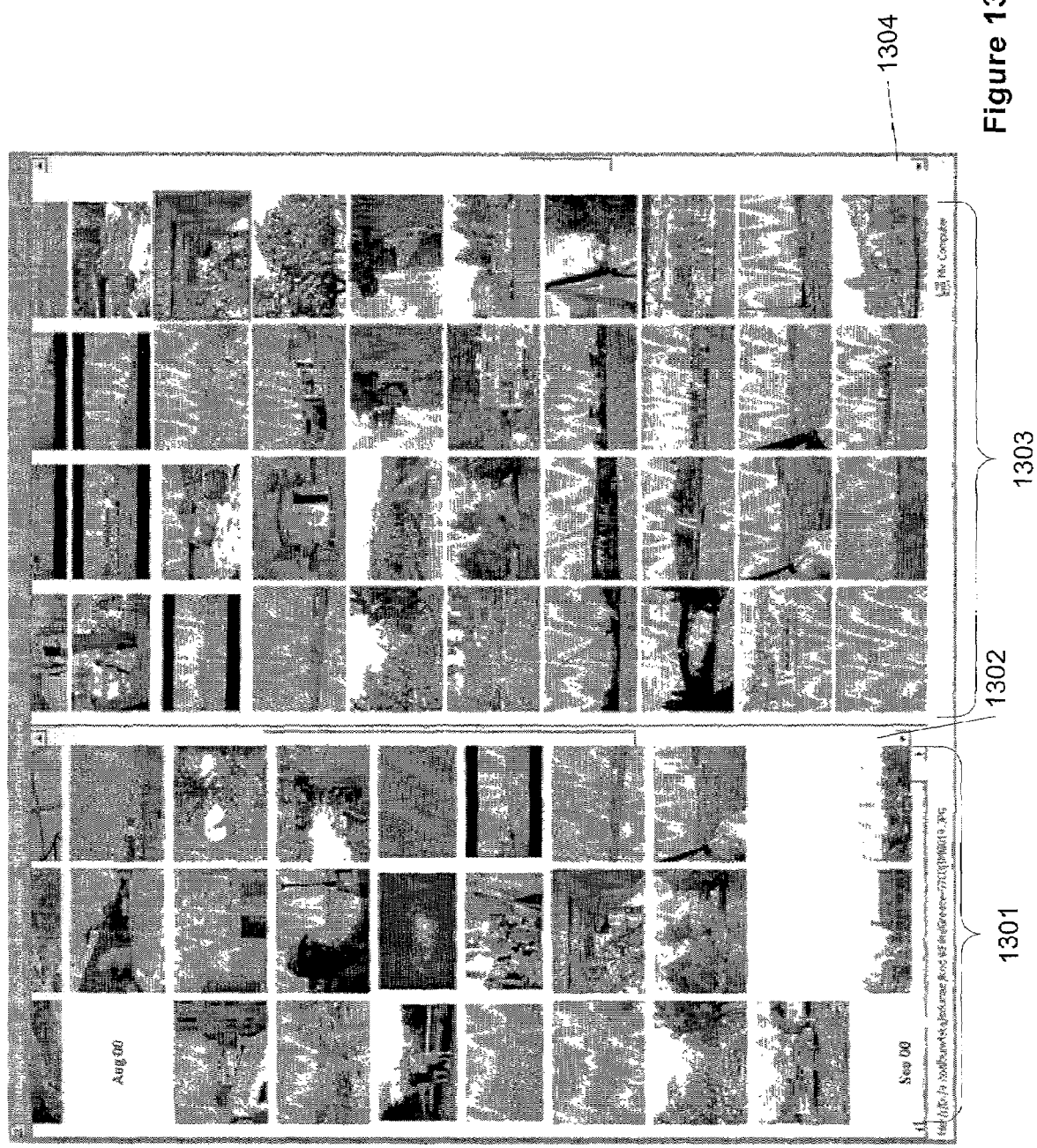
FIG. 13 illustrates another graphical user interface according to an aspect of the present invention.

A preferred user interface is shown in FIG. 13. Again, two panes are presented in the user interface. In the right pane, thumbnails 1303 of all of the user's photographs are shown. The thumbnails in 1303 are sorted by increasing creation time. There is a scrollbar 1304 to allow the user to scroll through his or her photographs. Representative images are shown as thumbnails in 1301 in the left pane. The thumbnails in 1301 are sorted by increasing creation time also. These representative images form a table of contents for the entire collection on the right. When a user clicks on (or otherwise selects by known techniques) a representative thumbnail in 1301 in the left pane, the scrollbar 1304 is scrolled so that the same thumbnail is vertically centered in the right pane and highlighted with a colored boarder, so as to be noticeable. When scroll bar 1302 is activated, the left pane containing representative thumbnails 1301 are scrolled thus allowing the user to quickly scan the collection. The user interface of FIG. 13 is desirable because the user may not always realize which cluster a photograph belongs to. Thus, the scrollbar 1304 provides the user with a mechanism to easily correct for incorrect cluster guesses.

While particular embodiments of the invention have been shown and described, it is recognized that various modifications thereof will occur to those skilled in the art without departing from the spirit and scope of invention. More particularly, it will be appreciated by those of ordinary skill in the art that the present application may be useful in many applications. The described embodiments are to be considered in all respects only as illustrative and not restrictive. Therefore, the scope of the herein-described invention shall be limited solely by the claims appended hereto.

We claim:

1. A method of organizing media objects in a database, comprising:
    capturing a media object;
    comparing the captured media object with media objects that are stored in the database;
    identifying the stored media objects in the database that include features in common with the captured media object;
    inferring organization information for the captured media object based upon information, obtained from each of the media objects including features in common with the captured media object, representing organization in the database; and
    organizing the captured media object in the database based upon the inferred organization information,
    wherein the step of inferring includes a step of determining whether data associated with the captured media object exceeds an adaptive threshold, wherein the adaptive threshold is based on a running average of log time gaps between media objects,
    wherein the step of inferring includes a step of determining into which group of stored media objects to store the captured media object.

2. The method of claim 1, wherein the adaptive threshold is computed based on the formula:

$$\log(X_n) = \log(17) + \frac{1}{20} \sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

3. A method of organizing media objects in a database, comprising:
    capturing a media object;
    identifying a feature of the captured media object;
    comparing the feature of the captured media object with stored media objects that are stored in the database;
    identifying the stored media objects having the identified feature;
    inferring organization information for the captured media object based upon information obtained from each of the stored media objects having the identified feature of the captured media object; and
    organizing the captured media object in the database based upon the inferred organization information,
    wherein the step of inferring includes a step of determining whether the identified feature of the captured media object exceeds an adaptive threshold, wherein the adaptive threshold is based on a running average of log time gaps between media objects,
    wherein the step of inferring includes a step of determining into which group of stored media objects to store the captured media object.

4. The method of claim 3, wherein the adaptive threshold is computed based on the formula:

$$\log(X_n) = \log(17) + \frac{1}{20} \sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

5. A method of organizing media objects in a database, comprising:
    capturing a media object;
    identifying a feature of the captured media object;
    performing an inexact search to detect stored media objects that are stored in the database having the identified feature of the captured media object;
    identifying the stored media objects having the identified feature of the captured media object;

inferring organization information for the captured media object based upon information obtained from each of the stored media objects having the feature identified in the captured media object; and organizing the captured media object in the database based upon the inferred organization information, wherein the step of inferring includes a step of determining whether the identified feature of the captured media object exceeds an adaptive threshold, wherein the adaptive threshold is based on a running average of log time gaps between media objects, wherein the step of inferring includes a step of determining into which group of stored media objects to store the captured media object.

6. The method of claim 5, wherein the adaptive threshold is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

7. A method of organizing media objects in a database, comprising:

capturing a media object;

identifying media objects stored in a database that are related to the captured media object;

obtaining information from each of the stored media objects that are related to the captured media object;

determining where the captured media object is to be stored with respect to the stored media objects that are related to the captured media object based upon the obtained information; and storing the captured media object in the database, wherein the step of determining where the captured media object is to be stored further comprises the step of computing an adaptive threshold, wherein the adaptive threshold is based on a running average of log time gaps between media objects.

8. The method of claim 7, wherein the adaptive threshold is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between the creation time of media object n and media object n+1.

9. A computer-readable medium having computer-executable instructions for performing the steps of:

capturing a media object;

detecting attributes of the captured media object indicated in metadata for the captured media object;

identifying media objects stored in the database that are related to the captured media object;

inferring organization information for the captured media object based upon information obtained from each of the stored media objects that are related to the captured media object; and organizing the captured media object in the database based upon the inferred organization information, wherein the step of inferring includes a step of determining whether data associated with the captured media object exceeds an adaptive threshold, wherein the adaptive threshold is based on a running average of log time gaps between media objects, wherein the step of inferring includes a step of determining into which group of stored media objects to store the captured media object.

10. The computer-readable medium according to claim 9, wherein the detecting step comprises:

detecting attributes of the captured media object generated when the captured media object was captured.

11. The computer-readable medium according to claim 9, wherein the organizing step includes storing the captured media object in the database, the computer-readable medium having further computer-executable instructions for performing the step of assigning at least one attribute to the metadata for the captured media object prior to storing the captured media object.

12. The computer-readable medium according to claim 9, having further computer-executable instructions for performing the step of:

assigning at least one attribute to the metadata for the captured media object based upon the inferred organization information.

13. The computer-readable medium according to claim 9, having further computer-executable instructions for performing the steps of:

detecting common features of the stored media objects;

identifying the stored media objects that have common features; and eliminating the stored media objects that are not identified prior to inferring the organizing information.

14. The computer-readable medium according to claim 13, having further computer-executable instructions for performing the step of:

adding information to the attributes of the metadata of the captured media object based upon the common features of the stored media objects.

15. The computer-readable medium according to claim 14, having further computer-executable instructions for performing the step of:

adding information to the metadata of the captured media object indicating that the inferred organization information for the captured media object was determined based upon an inference.

16. The computer-readable medium according to claim 9, having further computer-executable instructions for performing the step of:

adding information to the metadata of the captured media object indicating that the inferred organization information for the captured media object was determined based upon an inference.

17. The computer-readable medium having computer-executable instructions of claim 9, wherein the adaptive threshold is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

18. A method of organizing media objects in a database, comprising:
- capturing a media object;
- detecting attributes of the captured media object indicated in metadata for the captured media object;
- identifying media objects stored in the database that are related to the captured media object;
- inferring organization information for the captured media object based upon information obtained from each of the stored media objects that are related to the captured media object; and
- organizing the captured media object in the database based upon the inferred organization information,
- wherein the step of inferring includes a step of determining whether data associated with the captured media object exceeds an adaptive threshold, wherein the adaptive threshold is based on a running average of log time gaps between media objects,
- wherein the step of inferring includes a step of determining into which group of stored media objects to store the captured media object.

19. The method according to claim 1, wherein the detecting step comprises:
- detecting attributes of the captured media object generated when the media object was captured.

20. The method according to claim 1, wherein the organizing step includes storing the captured media object in the database, and wherein the method further comprises assigning at least one attribute to the metadata for the captured media object prior to storing the captured media object.

21. The method according to claim 1, further comprising:
- assigning at least one attribute to the metadata for the captured media object based upon the inferred organization information.

22. The method according to claim 1, further comprising:
- detecting common features of the stored media objects;
- identifying the stored media objects that have common features; and
- eliminating the stored media objects that are not identified prior to inferring the organization information.

23. The method according to claim 22, further comprising:
- adding information to the attributes of the metadata of the captured media object based upon the common features of the stored media objects.

24. The method according to claim 23, further comprising:
- adding information to the metadata of the captured media object indicating that the inferred organization information for the captured media object was determined based upon an inference.

25. The method according to claim 1, further comprising:
- adding information to the metadata of the captured media object indicating that the inferred organization information for the captured media object was determined based upon an inference.

26. The method of claim 1, wherein the adaptive threshold is a temporal designation and the group of stored media objects is a collection.

27. The method of claim 1, wherein the adaptive threshold is computed using the formula:

$$\log(X_n) = \log(17) + \frac{1}{20} \sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

28. A method of organizing media objects in a database, comprising:
- capturing a media object;
- detecting attributes of the captured media object indicated in metadata for the captured media object;
- performing an inexact search of the database based upon at least one of the attributes of the captured media object to identify media objects stored in the database that are related to the captured media object;
- inferring organization information for the captured media object based upon information obtained from each of the stored media objects that are related to the captured media object; and
- organizing the captured media object in the database based upon the inferred organization information,
- wherein the step of inferring includes a step of determining whether data associated with the captured media object exceeds an adantive threshold, wherein the adaptive threshold is based on a running average of log time gaps between media objects,
- wherein the step of inferring includes a step of determining into which group of stored media objects to store the captured media object.

29. The method according to claim 28, wherein the inexact search step comprises:
- performing an inexact search of the database based upon a date on which the captured media object was captured, wherein the date comprises one of the attributes of the captured media object.

30. The method according to claim 28, wherein the inexact search step comprises:
- performing an inexact search of the database based upon a location where the captured media object was captured, wherein the location comprises one of the attributes of the captured media object.

31. The method of claim 28, wherein the adaptive threshold is computed based on the formula:

$$\log(X_n) = \log(17) + \frac{1}{20} \sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

32. A computer-readable medium having computer-executable instructions for performing the steps of:
- capturing a media object;
- detecting attributes of the captured media object indicated in metadata for the captured media object;
- performing an inexact search of the database based upon at least one of the attributes of the captured media object to identify stored media objects stored in the database that are related to the captured media object;
- inferring organization information for the captured media object based upon information obtained from each of the stored media objects that are related to the captured media object; and
- organizing the captured media object in the database based upon the inferred organization information,
- wherein the step of inferring includes a step of determining whether data associated with the captured media object exceeds an adaptive threshold, wherein the adaptive threshold is based on a running average of log time gaps between media objects,
- wherein the step of inferring includes a step of determining into which group of stored media objects to store the captured media object.

33. The computer-readable medium according to claim 32, wherein the inexact search step comprises:
   performing an inexact search of the database based upon a date on which the captured media object was captured, wherein the date comprises one of the attributes of the captured media object.

34. The computer-readable medium according to claim 32, wherein the inexact search step comprises:
   performing an inexact search of the database based upon a location where the captured media object was captured, wherein the location comprises one of the attributes of the captured media object.

35. The computer-readable medium of claim 32, wherein the adaptive threshold is computed based on the formula:

$$\log(X_n) = \log(17) + \frac{1}{20} \sum_{i=n-10}^{n+9} \log(t_i + 1 - t_i),$$

wherein $t_i$ is a creation time of a media object i and $X_n$ a threshold that is compared to a difference between a creation time of media object n and media object n+1.

36. A computer-readable medium having computer-executable instructions for performing the steps of:
   capturing a media object;
   comparing the captured media object with stored media objects that are stored in the database;
   identifying the stored media objects in the database that include features in common with the captured media object;
   inferring organization information for the captured media object based upon information obtained from each of the media objects including features in common with the captured media object; and
   organizing the captured media object in the database based upon the inferred organization information,
   wherein the step of inferring includes a step of determining whether data associated with the captured media object exceeds an adaptive threshold, wherein the adaptive threshold is based on a running average of log time gaps between media objects,
   wherein the step of inferring includes a step of determining into which group of stored media objects to store the captured media object.

37. A computer-readable medium having computer-executable instructions for performing the steps of:
   capturing a media object;
   identifying a feature of the captured media object;
   comparing the feature of the captured media object with stored media objects that are stored in the database;
   identifying the stored media objects having the identified feature of the captured media object;
   inferring organization information for the captured media object based upon information obtained from each of the stored media objects having the identified feature of the captured media object; and
   organizing the captured media object in the database based upon the inferred organization information,
   wherein the step of inferring includes a step of determining whether the identified feature of the captured media object exceeds an adaptive threshold, wherein the adantive threshold is based on a running average of log time gaps between media objects,
   wherein the step of inferring includes a step of determining into which group of stored media objects to store the captured media object.

38. A computer-readable medium having computer-executable instructions for performing the steps of:
   capturing a media object;
   identifying a feature of the captured media object;
   performing an inexact search to detect stored media objects that are stored in the database having the identified feature of the captured media object;
   identifying the stored media objects having the identified feature of the captured media object;
   inferring organization information for the captured media object based upon information obtained from each of the stored media objects having the feature identified in the captured media object; and
   organizing the captured media object in the database based upon the inferred organization information,
   wherein the step of inferring includes a step of determining whether the identified feature of the captured media object exceeds an adaptive threshold, wherein the adaptive threshold is based on a running average of log time gaps between media objects,
   wherein the step of inferring includes a step of determining into which group of stored media objects to store the captured media object.

39. The computer-readable medium of claim 38, wherein the adaptive threshold is computed based on the formula:

$$\log(X_n) = \log(17) + \frac{1}{20} \sum_{i=n-10}^{n+9} \log(t_i + 1 - t_i),$$

wherein $t_i$ is a creation time of a media object i and $X_n$ is a threshold that is compared to a difference between the creation time of media object n and media object n+1.

40. A method of organizing media objects in a database, comprising:
   capturing a media object;
   determining attributes of the captured media object indicated in metadata for the captured media object;
   determining a date on which the captured media object was captured, wherein the date comprises one of the attributes of the captured media object;
   comparing the date with adaptive threshold date information, wherein the adaptive threshold date information is based on a running average of log time gaps between photographs;
   identifying media objects stored in the database that are related to the captured media object based upon the comparison;
   inferring organization information for the captured media object based upon information obtained from each of the stored media objects related to the captured media object; and
   organizing the captured media object in the database based upon the inferred organization information,
   wherein the step of inferring includes a step of determining whether the date is within the adaptive threshold date information, wherein the adantive threshold date information is based on a running average of log time gaps between media objects,
   wherein the step of inferring includes a step of determining into which group of stored media objects to store the captured media object.

41. The method according to claim 40, wherein the comparing step comprises:
   comparing the date on which the captured media object was captured with entries in a global date book.

42. The method of claim 40, wherein the adaptive threshold date information is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

43. A method of organizing media objects in a database, comprising:
- capturing a media object;
- determining attributes of the captured media object indicated in metadata for the captured media object;
- determining a date on which the captured media object was captured, wherein the date comprises one of the attributes of the captured media object;
- comparing the date on which the captured media object was captured with entries in a date book;
- inferring organization information for the captured media object based upon the comparison; and
- organizing the captured media object in the database based upon the inferred organization information,
- wherein the step of inferring includes a step of determining whether the date on which the captured media object was captured is within an adaptive threshold range, wherein the adaptive threshold range is based on a running average of log time gaps between media objects,
- wherein the step of inferring includes a step of determining into which group of stored media objects to store the captured media object.

44. The method of claim 43, wherein the adaptive threshold range is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

45. A computer-readable medium having computer-executable instructions for performing the steps of:
- capturing a media object;
- determining attributes of the captured media object indicated in metadata for the captured media object;
- determining a date on which the captured media object was captured, wherein the date comprises one of the attributes of the captured media object;
- comparing the date with adaptive threshold date information, wherein the adaptive threshold date information is based on a running average of log time gaps between media objects;
- identifying stored media objects stored in the database that are related to the captured media object based upon the comparison;
- inferring organization information for the captured media object based upon information obtained from each of the stored media objects related to the captured media object; and
- organizing the captured media object in the database based upon the inferred organization information,
- wherein the step of inferring includes a step of determining whether the date is within the adaptive threshold date information,
- wherein the step of inferring includes a step of determining into which group of stored media objects to store the captured media object.

46. The computer-readable medium having computer-executable instructions of claim 45, wherein the adaptive threshold date information is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

47. A computer-readable medium having computer-executable instructions for performing the steps of:
- capturing a media object;
- determining attributes of the captured media object indicated in metadata for the captured media object;
- determining a date on which the captured media object was captured, wherein the date comprises one of the attributes of the captured media object;
- comparing the date on which the captured media object was captured with entries in a date book;
- inferring organization information for the captured media object based upon the comparison; and
- organizing the captured media object in the database based upon the inferred organization information,
- wherein the step of inferring includes a step of determining whether the date on which the captured media object was captured is within an adaptive threshold range, wherein the adaptive threshold range is based on a running average of log time gaps between media objects,
- wherein the step of inferring includes a step of determining into which group of stored media objects to store the captured media object.

48. The computer-readable medium according to claim 47, wherein the comparing step comprises:
- comparing the date on which the captured media object was captured with entries in a global date book.

49. The computer-readable medium having computer-executable instructions of claim 47, wherein the adaptive threshold range is computed based on the formula:

$$\log(X_n) = \log(17) + \frac{1}{20}\sum_{i=n-10}^{n+9} \log(t_i + 1 - t_i),$$

wherein $t_i$ is a creation time of a media object i and $X_n$ is a threshold that is compared to a difference between a creation time of media object n and media object n+1.

* * * * *

UNITED STATES PATENT AND TRADEMARK OFFICE
CERTIFICATE OF CORRECTION

PATENT NO.         : 7,076,503 B2                                    Page 1 of 1
APPLICATION NO. : 10/021255
DATED              : July 11, 2006
INVENTOR(S)        : Platt et al.

It is certified that error appears in the above-identified patent and that said Letters Patent is hereby corrected as shown below:

In column 9, line 19, after "24$^{th}$" insert -- . --.

In column 9, line 20, after "24$^{th}$" insert -- , --.

In column 15, line 1, delete "FIG 10." and insert -- FIG. 10. --, therefor.

In column 15, line 50, after "of" insert -- the --.

In column 20, line 17, in Claim 28, delete "adantive" and insert -- adaptive --, therefor.

In column 21, line 62–63, in Claim 37, delete "adantive" and insert -- adaptive --, therefor.

In column 22, line 58, in Claim 40, delete "adantive" and insert -- adaptive --, therefor.

In column 22, line 64, in Claim 41, delete "according to claim 40" and insert -- according to claim 43 --, therefor.

Signed and Sealed this

Thirtieth Day of March, 2010

David J. Kappos
*Director of the United States Patent and Trademark Office*